(12) United States Patent
Gatta

(10) Patent No.: US 7,845,597 B2
(45) Date of Patent: Dec. 7, 2010

(54) CONDUIT CARRIER SYSTEM

(76) Inventor: Scott Gatta, 2 Ferncrest Dr., Johnston, RI (US) 02919

( * ) Notice: Subject to any disclaimer, the term of this patent is extended or adjusted under 35 U.S.C. 154(b) by 898 days.

(21) Appl. No.: 11/559,099

(22) Filed: Nov. 13, 2006

(65) Prior Publication Data

US 2007/0108351 A1    May 17, 2007

Related U.S. Application Data

(60) Provisional application No. 60/737,677, filed on Nov. 17, 2005.

(51) Int. Cl.
 *E21F 17/02* (2006.01)
(52) U.S. Cl. ............................ 248/58; 248/57; 248/70
(58) Field of Classification Search .............. 248/228.7, 248/230.7, 57, 58, 61, 216.4, 70, 73
See application file for complete search history.

(56) References Cited

U.S. PATENT DOCUMENTS

| | | | |
|---|---|---|---|
| 1,497,564 A | 6/1924 | Howells | |
| 1,552,535 A | 9/1925 | Beerstecher | |
| 1,726,244 A * | 8/1929 | Shefstead | 248/574 |
| 2,434,387 A | 1/1948 | Brandt | |
| 2,537,437 A * | 1/1951 | Aaby | 248/57 |
| 2,552,879 A | 5/1951 | Woerner | |
| 2,630,256 A | 3/1953 | O'Shea | |
| 2,907,506 A | 10/1959 | Sammons | |
| 3,848,786 A | 11/1974 | Baxter | |
| 4,390,117 A | 6/1983 | Fagan | |
| 4,638,965 A | 1/1987 | DeBruine et al. | |
| 4,684,092 A * | 8/1987 | Reiker | 248/200.1 |
| 4,826,387 A | 5/1989 | Audet | |
| 4,954,030 A | 9/1990 | Szucs et al. | |
| 4,960,356 A | 10/1990 | Wrenn | |
| 5,009,350 A | 4/1991 | Schill et al. | |
| 5,029,785 A | 7/1991 | Besong, Jr. | |
| 5,288,000 A | 2/1994 | Adamson | |
| 5,458,268 A | 10/1995 | Hill | |
| 5,464,141 A | 11/1995 | Brindle | |
| 5,465,890 A | 11/1995 | Allen | |
| 5,535,930 A | 7/1996 | Lee | |
| 5,641,105 A | 6/1997 | Goto | |
| 5,746,362 A | 5/1998 | Hickey | |
| 5,810,226 A | 9/1998 | Lee | |

(Continued)

*Primary Examiner*—Terrell Mckinnon
*Assistant Examiner*—Bradley H Duckworth
(74) *Attorney, Agent, or Firm*—Barlow, Josephs & Holmes, Ltd.

(57) ABSTRACT

A conduit carrier system for securing a storage pipe to a ladder rack including a support member having a slot extending the length thereof is disclosed. The carrier system of the present invention includes a holder portion having a cradle surface configured and arranged to cradle the storage pipe. A base portion depends from the holder portion and a pair of feet depends from the base portion. The pair of feet are configured and arranged to cooperate with the slot of the tubular support member of the ladder rack to secure the base portion to the ladder rack. The pair of feet is selectively adjustable to clamp a portion of the tubular support member between the base portion and the pair of feet. Further included is a means for securing said storage pipe to said holder portion.

6 Claims, 7 Drawing Sheets

U.S. PATENT DOCUMENTS

| | | | |
|---|---|---|---|
| 6,431,502 B1 * | 8/2002 | Goodman | 248/74.1 |
| 6,520,456 B1 | 2/2003 | Neider et al. | |
| 6,736,300 B2 | 5/2004 | Deakin | |
| 6,793,109 B2 | 9/2004 | Gates et al. | |
| 6,854,627 B2 | 2/2005 | Foo et al. | |
| 2003/0178456 A1 | 9/2003 | Deakin | |

* cited by examiner

CONDUIT CARRIER SYSTEM

CROSS-REFERENCE TO RELATED APPLICATION

The present application claims priority to earlier filed U.S. Provisional Patent Application Ser. No. 60/737,677, filed Nov. 17, 2005, the contents of which are incorporated herein by reference.

BACKGROUND OF THE INVENTION

1. Field of the Invention

The present invention relates generally to roof rack mounting and carrier systems and more particularly to a conduit carrier system that can be slidably mounted to a TracVan brand ladder rack or bolted onto other conventional rack systems, which are used commonly in the construction trades.

2. Background of the Related Art

In the construction trades it is common to use a section of large pipe as a storage vessel or container for other smaller pipe used at construction sites.

Typically the pipe used is PVC pipe of four or six inches in diameter. The use of a pipe as a storage container has the advantages of protecting the work materials from damage and also preventing materials from being lost.

The storage pipe is typically transported by a vehicle such as a van or a pickup truck. Tradesmen have transported the storage pipe within the vehicle itself. However, if not properly restrained, the storage pipe can roll around and possibly cause damage to vehicle and its contents or even injure the occupants. Tradesmen have also jury-rigged the storage pipe to ladder racks or other external racks using bungee cords, elastic stays and other strapping arrangements and tie-downs. However, without proper fitting restraints, it is possible for the storage pipe to become loose. If the storage pipe is lost while the vehicle is in motion, the results can be catastrophic.

To solve this problem, tradesmen have bolted the storage pipe directly to the vehicle or the vehicle's ladder racks. However, bolting the storage pipe requires that holes be drilled through the ladder racks or the body of the vehicle. This solution necessarily causes damage to the vehicle and/or the rack and the resulting structure is in a fixed location and is not adjustable.

One ladder rack system that is popular in the trades is a TracVan brand ladder rack manufactured by TracRac, Inc. The TracVan brand ladder rack, like many ladder racks, has tubular support members that are configured to be mounted to the roof or side of the vehicle. A ladder is secured to the support members using conventional tie-downs or other holders configured to secure a ladder thereto. Unlike other ladder racks, however, the TracRac system includes a slot laterally extending the length of the tubular rack members permitting adjustable ladder holders to be positioned on the ladder rack. However, no conduit carrier system has been created to mount to a TracVan ladder rack without drilling into the support members.

Therefore, there is a need for a conduit carrier system that can be mounted to a TracVan brand ladder rack without the need for drilling, yet can also be mounted to other conventional ladder racks.

SUMMARY OF THE INVENTION

The present invention solves the problems of the prior art by providing carrier system for holding a storage pipe securely during travel that can easily be adjusted or removed if desired and does not require drilling to install on a TracVan brand ladder rack or other similar slotted ladder rack system.

Accordingly, among the objects of the present invention is the provision for a conduit carrier system that securely holds a storage pipe to a ladder rack.

Another provision of the present invention is the provision for a conduit carrier system that can be installed onto a ladder rack without drilling holes through the ladder rack itself.

Another provision of the present invention is a conduit carrier system that can be easily adjusted and removed if desired.

BRIEF DESCRIPTION OF THE DRAWINGS

These and other features, aspects, and advantages of the present invention will become better understood with reference to the following description, appended claims, and accompanying drawings where:

DESCRIPTION OF THE PREFERRED EMBODIMENT

Figure 1:
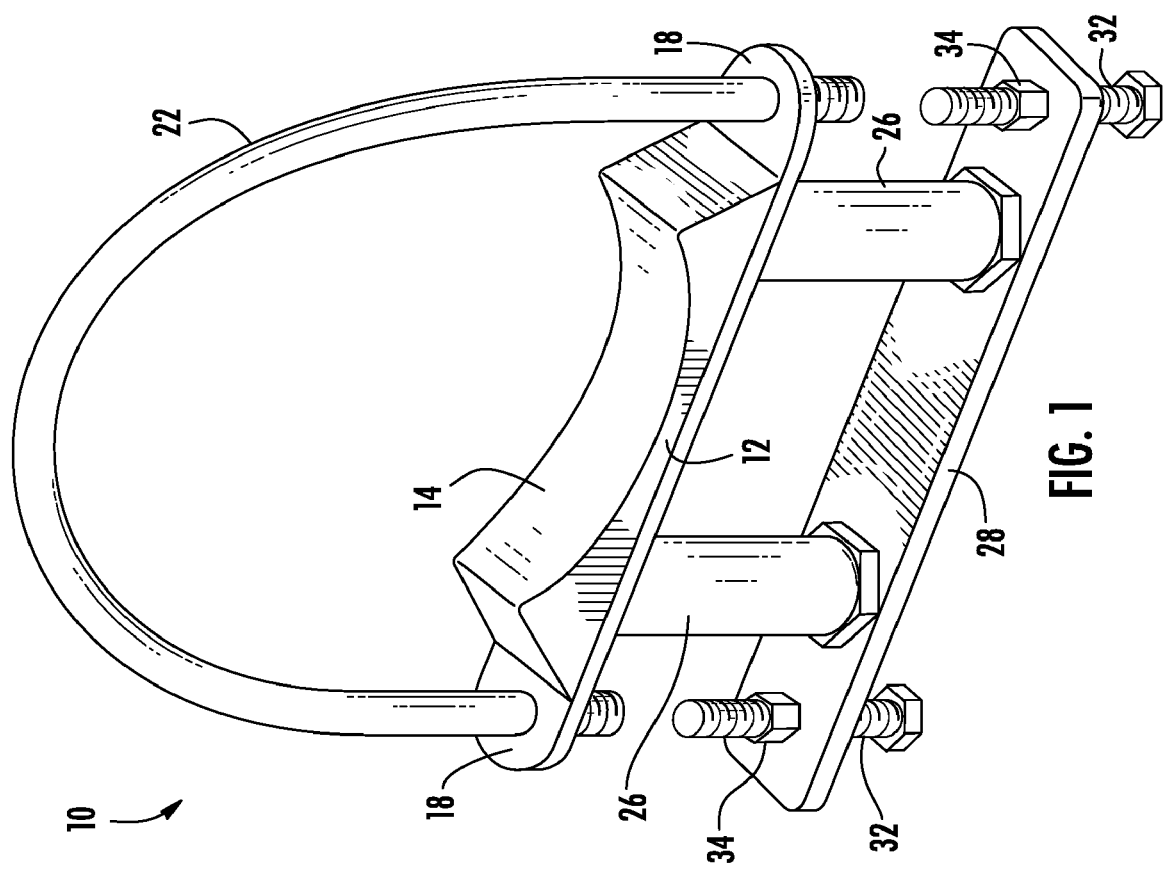
FIG. 1 is a perspective view of the conduit carrier system of the present invention.
Figure 2:
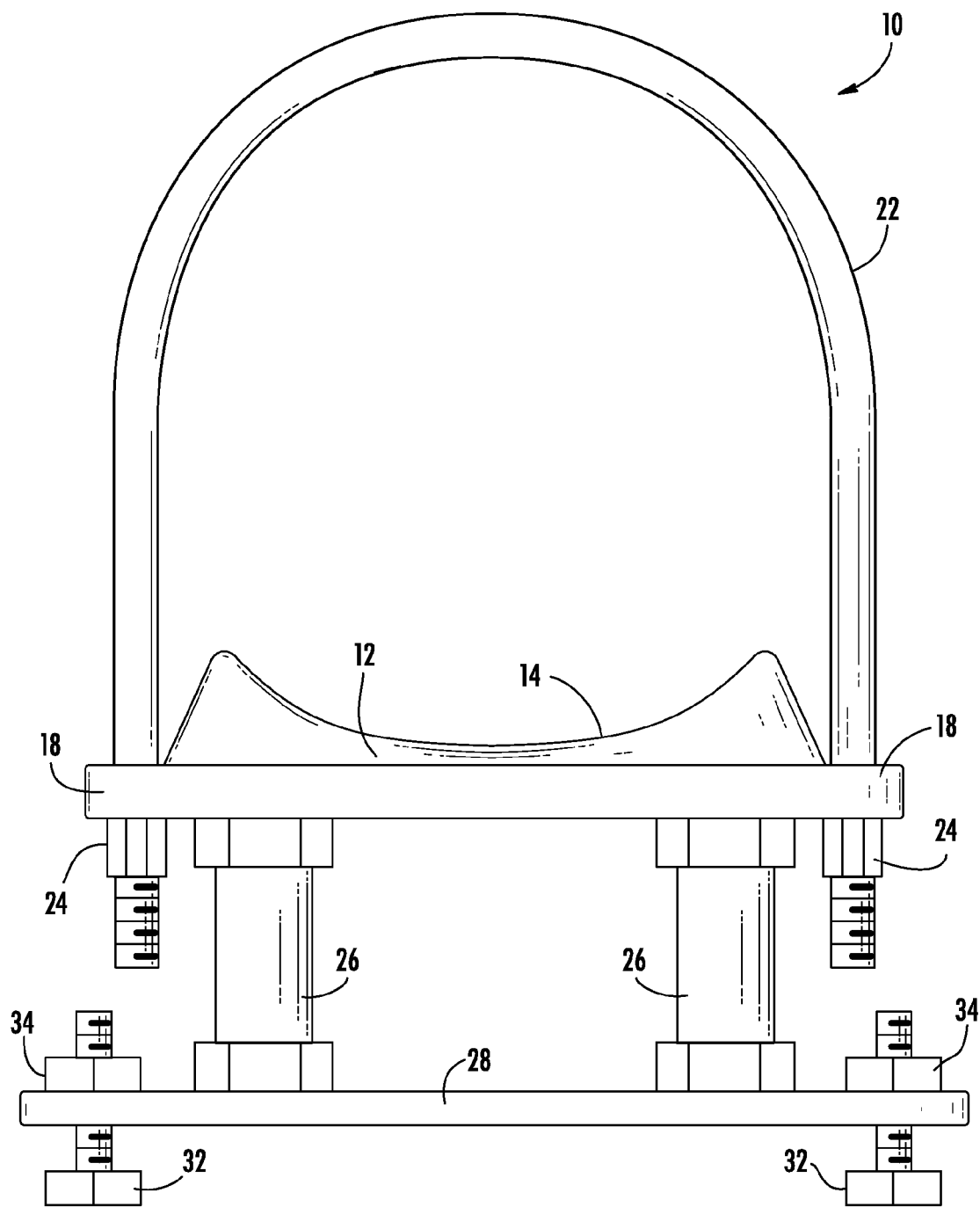
FIG. 2 is a front elevation view thereof.
Figure 3:
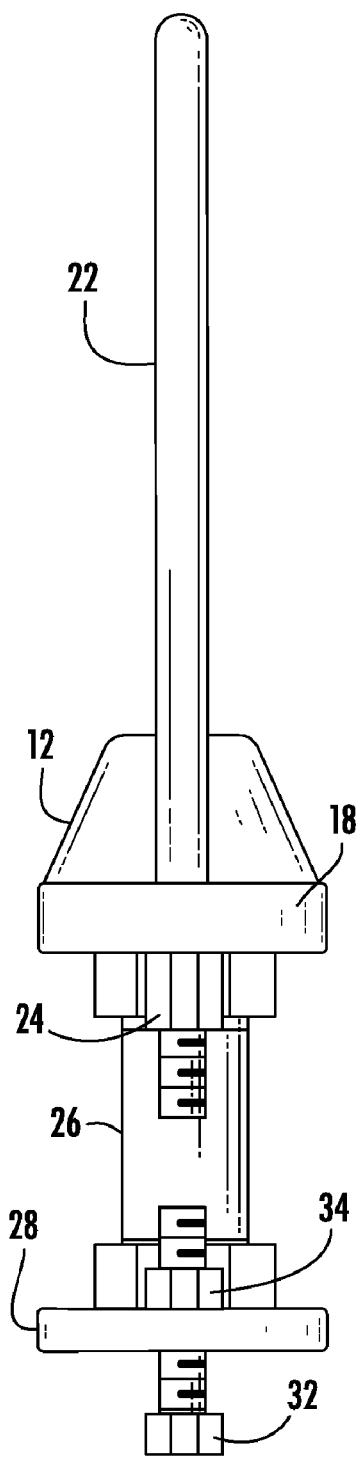
FIG. 3 is a side elevation view thereof.
Figure 4:
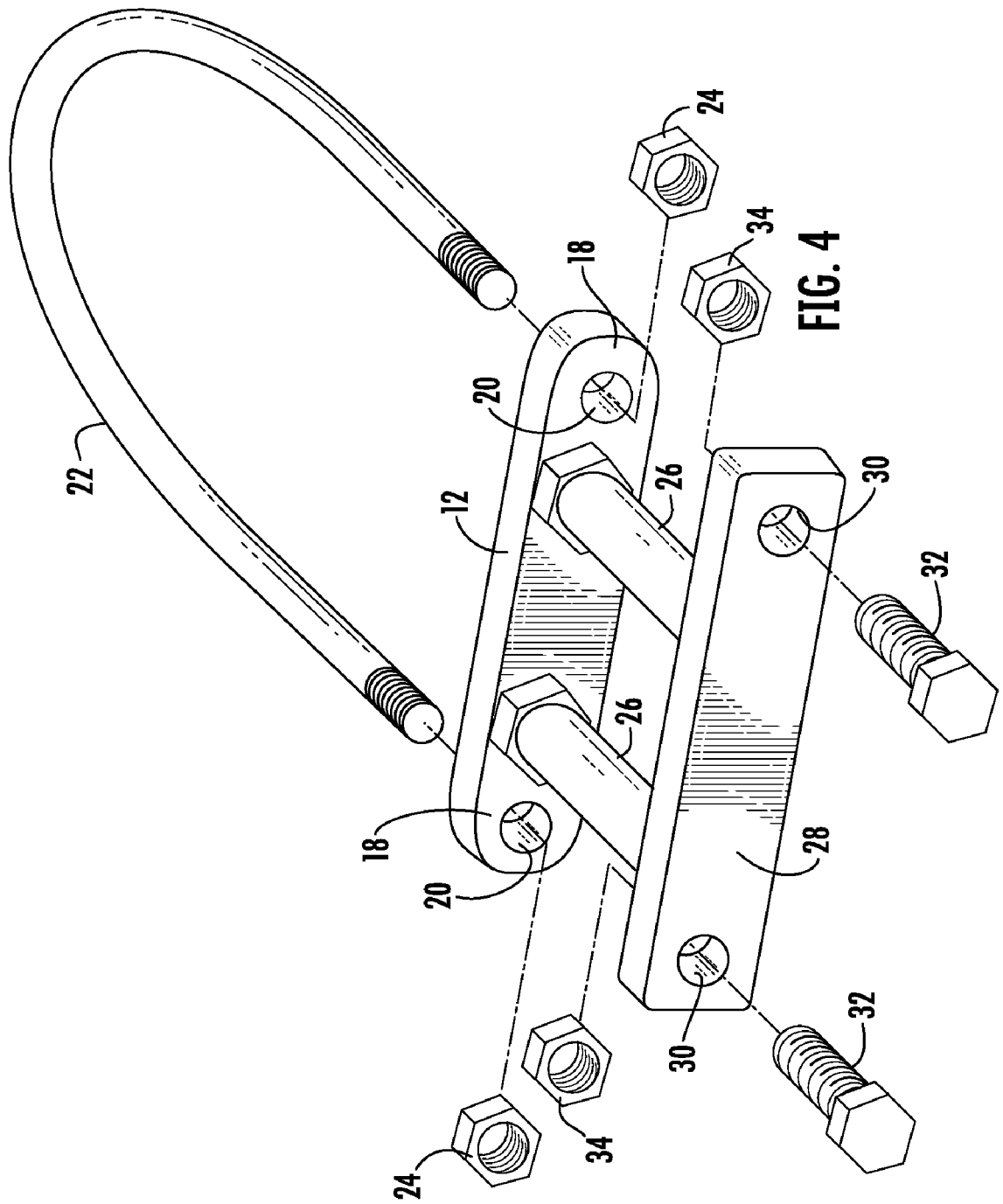
FIG. 4 is an exploded view thereof.
Figure 5:
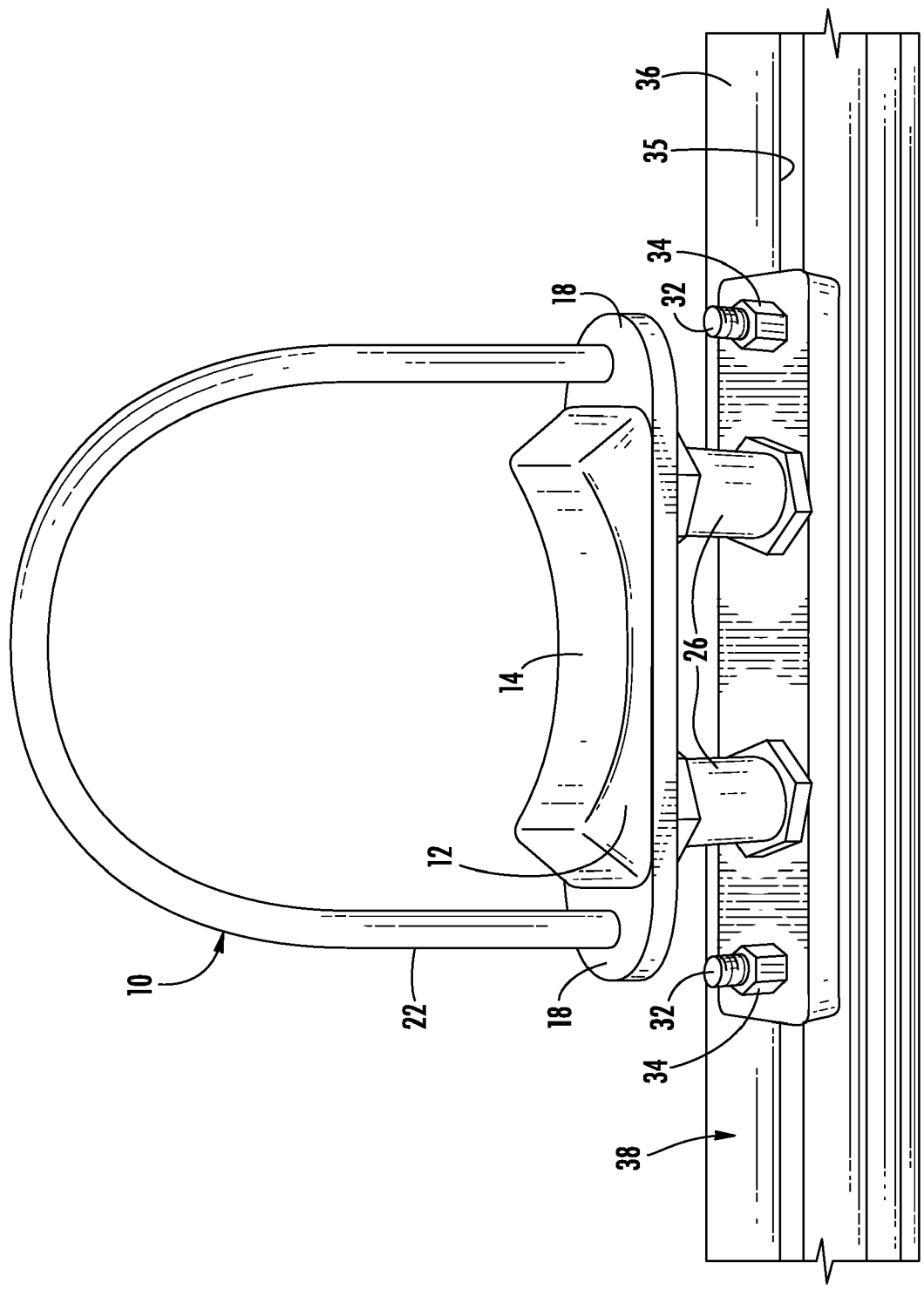
FIG. 5 is a top perspective view of the conduit carrier system of the present invention coupled to a ladder rack.
Figure 6:
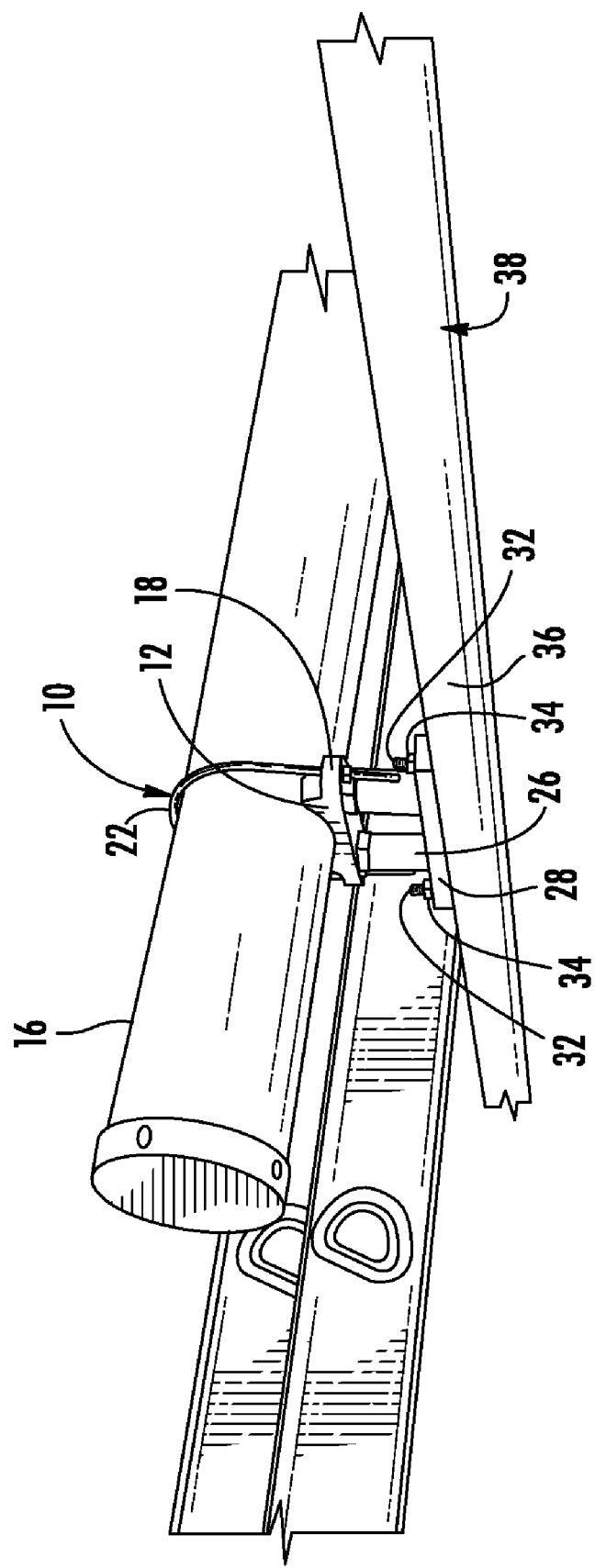
FIG. 6 is a bottom perspective view of the conduit carrier system of the present invention coupled to a ladder rack, securing a storage pipe thereto.

Referring to FIGS. 1-4, the conduit carrier system of the present invention includes a pair uniquely shaped holders that are configured and arranged to hold a storage pipe. A single holder is shown generally at 10. The holders 10 can easily be mounted to a TracVan brand ladder rack 38, manufactured by TracRac, Inc., without the use of additional hardware or requiring drilling of holes through the ladder rack structure as seen in FIGS. 5 and 6.

In particular, each holder 10 has a holder portion 12 with a cradle surface 14 configured to cradle either a four inch or six inch PVC pipe 16, which are often used as storage pipes, although this surface 14 could be easily arranged to accommodate other size pipes. Preferably, the cradle surface 14 is concave to facilitate holding the storage pipe 16. It is important to note that the cradle surface 14 is dependent upon the shape of the storage pipe 16. For instance, a storage pipe 16 that has a square cross-section would be held better by a cradle surface 14 that has a similar square cross-section profile.

Projecting laterally from the each side of each holder portion 12 are upper members 18 each having a hole 20 therethrough. While the storage pipe 16 is resting on the cradle surface 14, a u-bolt 22 is passed over the pipe 16 and into the holes 20 in the upper members 18 on each side of the holder portion 14. Nuts 24 are then secured to each end of the u-bolt 22 to secure the storage pipe 16 in place on each holder 10. Although a u-bolt 22 has been found to be a suitable component to use to retain the storage pipe 16 to each holder 10, other structures could be used with equal effectiveness. For instance, a strap could be used or another shape of bracket.

Depending downwardly from the bottom of each holder 10 is a pair of tubular risers 26, which are attached to a base plate 28. Although two tubular risers 26 are preferred to add strength and rigidity to the holder 10, other shapes and numbers of risers 26 could work as well.

Figure 7:
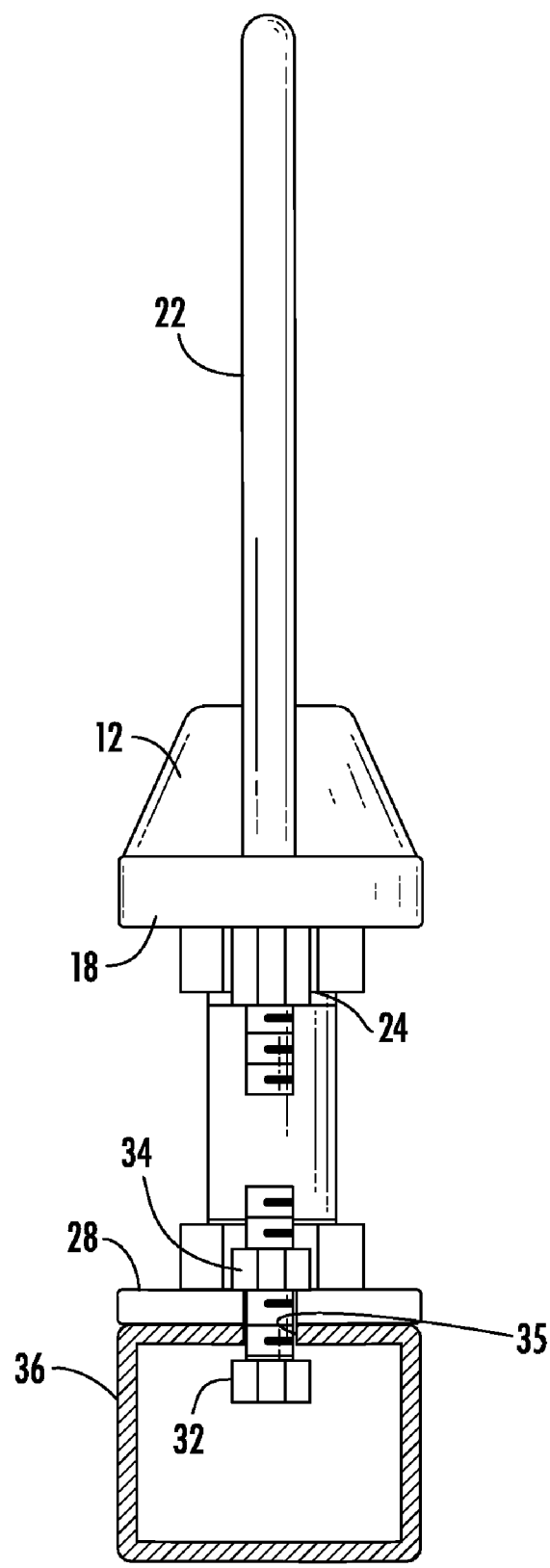
FIG. 7 is a side cross-section view of the conduit carrier system of the present invention coupled to a ladder rack.

The base plate 28 extends laterally underneath the tubular risers 26 and has two apertures 30 formed thereon. Bolts 32 may be received into the apertures 30. A nut 34 retains the bolt 32 in the aperture 30 and to the base plate 28 of the holder 10. The head of the bolt 32 serves as a foot that can be inserted into the slot 35 on the tubular support member 36 of a TracVan brand ladder rack 38 as seen in FIG. 7. The neck of the bolt 32 fits into the slot 35 formed on the support member 36. While the nuts 34 are loose on the bolts 32, the holder 10 can be manually adjusted to the desired position on the ladder rack 38. Tightening of the nuts 34 on the bolts 32 secures the base plate 28 of the holder 10 against the tubular support member 36 and keeps the holder 10 from potentially sliding on the ladder rack 38.

The holders 10 can also be mounted to other conventional ladder racks 38 by drilling through the support members 36 of the ladder racks 38 and bolting the holders 10 thereto. Additionally, the holders 10 may also be bolted to other surfaces too in a similar manner.

Therefore, it can be seen that the present invention provides a unique solution to the problem of providing a conduit carrier system that does not require drilling to attach the storage pipe to a TracVan ladder rack, yet can also be mounted to a conventional ladder rack.

It would be appreciated by those skilled in the art that various changes and modifications can be made to the illustrated embodiments without departing from the spirit of the present invention. All such modifications and changes are intended to be within the scope of the present invention exceopt as limited by the appended claims.

What is claimed is:

1. A conduit carrier system for securing a storage pipe to a ladder rack, said ladder rack including a tubular support member having a longitudinal slot extending the length thereof, said conduit carrier system comprising:
    a base portion having a bottom surface and a top surface;
    a holder portion extending upwardly from and supported by said base portion, said holder portion having a cradle surface formed thereon configured and arranged to cradle said storage pipe;
    a u-bolt having a pair of ends configured and arranged to be removably secured to said holder portion whereby said u-bolt passes over said storage pipe when resting in said cradle surface of said holder portion to trap said storage pipe between said u-bolt and said cradle surface, said pair of ends terminating prior to reaching said base portion;
    a pair of feet depending from said bottom surface of the base portion, each of said pair of feet having a foot portion with a clamping surface and an uninterrupted bottom surface and a leg portion configured and arranged to slide within the longitudinal slot of the tubular support member of said ladder rack to secure said base portion to said ladder rack, said leg portion terminating prior to reaching said holder portion; and
    said pair of feet including adjustment means connected to the leg portion and extending from the top surface of the base portion for selectively and independently adjusting each respective clamping surface of said foot portion relative to the bottom surface of the base portion and to apply a clamping force between the bottom surface of the base portion and each respective clamping surface of said foot portion of the pair of feet.

2. The article of claim 1, wherein said cradle surface is concave.

3. A conduit carrier system for securing a storage pipe to a ladder rack, said ladder rack including a tubular support member having a longitudinal slot extending the length thereof, said conduit carrier system comprising:
    a base plate having a bottom surface and a top surface;
    a pair of tubular risers extending upwardly from said base plate;
    a holder portion extending upwardly from and supported by said tubular risers, said holder portion having a concave surface formed thereon configured and arranged to cradle a storage pipe;
    a pair of opposing upper members extending outwardly from said holder portion, each of said members having an aperture formed thereon;
    a u-bolt configured and arranged to be removably secured thorough said apertures of said upper members to trap securely said storage pipe to said concave surface of said holder portion; said u-bolt having a pair of ends that terminate prior to reaching said base portion;
    a pair of feet depending from said bottom surface of the base plate, each of said pair of feet having a foot portion with a clamping surface and an uninterrupted bottom surface and a leg portion configured and arranged to slide within with the longitudinal slot of the tubular support member of said ladder rack to secure said base plate to said ladder rack, said leg portion terminating prior to reaching said holder portion; and
    said pair of feet including adjustment means connected to the leg portion and extending from the top surface of the base portion for selectively and independently adjusting each respective foot portion relative to the bottom surface of the base portion and to apply a clamping force between the bottom surface of the base portion and the clamping surface of each respective foot portion of the pair of feet.

4. A conduit carrier system for securing a storage pipe to a ladder rack, said ladder rack including a tubular support member having a longitudinal slot extending the length thereof, said conduit carrier system comprising:
    a base portion having a bottom surface and a top surface;
    a holder portion connected to and supported upwardly by said base portion, said holder portion having a cradle surface formed thereon configured and arranged to cradle said storage pipe; and
    means for securing said storage pipe to said holder portion;
    at least one foot depending from said bottom surface of the base portion, each at least one foot having a foot portion with a clamping surface and an uninterrupted bottom surface and a leg portion configured and arranged to slide within the longitudinal slot of the tubular support member of said ladder rack to secure said baseplate to said ladder rack, said leg portion terminating prior to reaching said holder portion; and
    said foot including adjustment means connected to the leg portion and extending from the top surface of the base portion for selectively and independently adjusting each foot portion relative to the bottom surface of the base portion and to apply a clamping force between the bottom surface of the base portion and the clamping surface of each respective foot portion of the at least one foot.

5. The article of claim 4, wherein said means for securing said storage pipe to said holder portion comprises:
   a pair of opposing upper members extending outwardly from said holder portion, each of said members having an aperture formed thereon; and
   a u-bolt having a pair of ends configured and arranged to pass through said apertures on said opposing upper members and be removably secured to said opposing upper members; and
   whereby said u-bolt passes over said storage pipe when resting in said cradle surface of said holder portion to trap said storage pipe between said u-bolt and said cradle surface.

6. The article of claim 4, wherein said cradle surface is concave.

* * * * *